(12) United States Patent
Strunk

(10) Patent No.: US 10,489,026 B2
(45) Date of Patent: Nov. 26, 2019

(54) ACCESSIBLE USER INTERFACE FOR APPLICATION WITH MOVING ITEMS

(71) Applicant: TARGET BRANDS INC., Minneapolis, MN (US)

(72) Inventor: Ryan Strunk, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 492 days.

(21) Appl. No.: 14/924,153

(22) Filed: Oct. 27, 2015

(65) Prior Publication Data
US 2017/0115854 A1   Apr. 27, 2017

(51) Int. Cl.
| | | |
|---|---|---|
| G06F 3/0482 | (2013.01) | |
| G06F 3/0484 | (2013.01) | |
| G06F 3/01 | (2006.01) | |
| G09B 21/00 | (2006.01) | |
| G06F 3/0486 | (2013.01) | |
| G06F 3/0488 | (2013.01) | |
| G06F 9/451 | (2018.01) | |

(52) U.S. Cl.
CPC .......... G06F 3/04842 (2013.01); G06F 3/016 (2013.01); G06F 3/0482 (2013.01); G06F 3/0486 (2013.01); G06F 3/04883 (2013.01); G06F 9/453 (2018.02); G09B 21/007 (2013.01)

(58) Field of Classification Search
CPC .................................. G06F 3/017; G06F 1/18
See application file for complete search history.

(56) References Cited

U.S. PATENT DOCUMENTS

| | | | | |
|---|---|---|---|---|
| 2009/0070036 A1* | 3/2009 | Nakamura | ......... | G01C 21/3629 701/431 |
| 2010/0146422 A1* | 6/2010 | Seong | ................... | G06F 3/0482 715/765 |
| 2010/0241955 A1* | 9/2010 | Price | ..................... | G06F 3/0425 715/702 |
| 2010/0306657 A1* | 12/2010 | Derbyshire | .......... | G11B 19/025 715/727 |
| 2011/0283238 A1* | 11/2011 | Weising | .................. | G06F 9/451 715/852 |
| 2013/0337119 A1* | 12/2013 | Hoog | .................... | G06F 3/0488 426/231 |

(Continued)

OTHER PUBLICATIONS

"Stem Stumper," by Ananse Productions, LLC, available at least as of Oct. 24, 2013, printed on Feb. 18, 2016, available at iTunes App Store (2 pages).

(Continued)

*Primary Examiner* — Rayeez R Chowdhury
(74) *Attorney, Agent, or Firm* — Hamre, Schumann, Mueller & Larson, P.C.

(57) ABSTRACT

A method for facilitating browsing of an accessible user interface is disclosed. The method includes, providing an application for a user device, the user device having an input and a display, the application permitting a user to select an object selection area associated with a moving item using the input of the device; receiving an indication of the object selection area from the user device; identifying the moving item associated with the object selection area; generating a non-visual feedback to the user; and providing the user interface for display on the user device.

12 Claims, 4 Drawing Sheets

(56) References Cited

U.S. PATENT DOCUMENTS

2015/0135132 A1* 5/2015 Josephson ............. G06F 3/0482
715/784
2015/0177962 A1* 6/2015 Seong ................. G06F 3/04845
715/781

OTHER PUBLICATIONS

"Audio Defence," by Somethin' Else, available at least as of 2013, printed on Feb. 18, 2016, available at iTunes App Store (3 pages).
"A Dark Room," by Amirali Rajan, available at least as of 2014, printed on Feb. 18, 2016, available at iTunes App Store (3 pages).
"Dice World!," by Pangia Games, Inc., available at least as of 2014, printed on Feb. 18, 2016, available at iTunes App Store (3 pages).
"King of Dragon Pass," by A Sharp, LLC, available at least as of 2011, printed on Feb. 18, 2016, available at iTunes App Store (2 pages).

* cited by examiner

ACCESSIBLE USER INTERFACE FOR APPLICATION WITH MOVING ITEMS

FIELD

Embodiments of this disclosure relate generally to a user interface for a computing device. More specifically, the embodiments relate to an accessible user interface such as, for example, a user interface for a computing device adapted to be accessible for visually impaired users that includes one or more moving objects.

BACKGROUND

Consumers purchase products in retail stores and via retail websites accessible from the Internet. Shopping via a retail website allows consumers to interact with pictures, videos, and/or audio clips relating to the products the consumer is contemplating purchasing. Often, shopping via the retail website allows the consumer to read reviews by other consumers, search for related products, search for products that other consumers bought at the same time, or the like. In some instances, the inventory of products available from a retailer through the retail website can be different from the products available at the retail store.

Improved ways to enhance a consumer's shopping experience are desirable.

SUMMARY

In some embodiments, an accessible user interface can enable a person with certain types of sensory impairments, particularly visual impairments, to access an application for a mobile device that includes moving objects. In some embodiments, the accessible user interface can enable a person with a visual impairment to browse a user interface relying on touch sensing using a finger, stylus, or the like.

In some embodiments, the accessible user interface includes an object selection area that is associated with a moving item in the accessible user interface.

In some embodiments, when the object selection area is selected via touch, an audible or other notification can be provided to the user. In some embodiments this can include a vibration and/or an audible alert.

In some embodiments, a user enables an accessibility functionality of a mobile device prior to visiting the accessible user interface.

A method for facilitating browsing of an accessible user interface is disclosed. The method includes providing an application for a user device, the user device having an input and a display, the application permitting a user to select an object selection area associated with a moving item using the input of the device when the moving item is displayed on the display of the user device; receiving an indication of the selected object selection area from the user device; identifying the moving item associated with the object selection area; generating a non-visual feedback to the user, the non-visual feedback being based on the identified moving item; and providing the accessible user interface for display on the user device.

A computer-implemented method for providing an accessible user interface on a display of a user device is disclosed. The computer-implemented method includes storing object selection area information in a product database, the object selection area information corresponding to a plurality of object selection areas, each of the object selection areas being associated with a product in the product database; via an application that is accessible from the user device, receiving, from the user device, an input selection of a selected object selection area, the selected object selection area corresponding to an area of the display of the user device including a moving item; determining the object selection area information from the product database based on the selected object selection area; and providing non-visual information on one of the products in the product database based on the selected object selection area to the user via an output of the user device.

An accessible user interface is disclosed. The accessible user interface includes an application loadable onto a user device, the application provides the accessible user interface for selecting one of a plurality of object selection areas, each of the plurality of object selection areas associated with one of a plurality of moving items, the plurality of moving items moving across a display of the user device, the accessible user interface displayable on the user device, each of the plurality of moving items being selectable by a user, wherein each object selection area associated with each moving item is relatively larger in size than the associated moving item.

BRIEF DESCRIPTION OF THE DRAWINGS

References are made to the accompanying drawings that form a part of this disclosure, and which illustrate embodiments in which the systems and methods described in this specification can be practiced.

Like reference numbers represent like parts throughout.

DETAILED DESCRIPTION

Users with, for example, a visual impairment interact with their computing devices in a different manner than users without a visual impairment. For example, a mobile device (e.g., a smartphone, a tablet, a wearable device, etc.) generally includes an accessibility functionality that enables a user with a visual impairment to browse through a screen of options relying on a combination of touch and auditory responses to the touches. For example, mobile operating system iOS (available on products such as, but not limited to, an iPhone, iPad, or the like, which are sold by Apple Inc.) includes a setting which enables a user to receive audible feedback indicating options on a particular screen. In general, however, the audible feedback can be enabled for static images and or menu items. Websites and other applications developed for mobile devices (such as, but not limited to, those running iOS or the like) often include objects that are not stationary (e.g., automations, etc.). Improved accessibility options for an application interface including one or more mobile objects are desirable.

An accessible user interface can enable a device user, in particular, the device user having certain types of impairments (e.g., visual impairment), to use a computing device (e.g., such as, but not limited to, a cellular/mobile phone, a tablet device, or the like) to access an application (e.g., a website or other application that runs on such a computer device) in a manner that is substantially similar to or the same as a device user without a similar type of impairment. In general, the accessible user interface, as used in this specification, is generally usable (e.g., accessible) to users having a visual impairment. It will be appreciated that this may include users who are both visually and hearing impaired. In some embodiments, an electronic braille display may be used to provide non-visual feedback. Further, the accessible user interface can be used by a device user who does not have a visual impairment.

A moving object, as used herein, generally refers to an object that is virtually moving about a display of a computing device. For example, a moving object may start in a first location of the display of the computing device, and be traversing to a second location of the display of the computing device.

Figure 1:
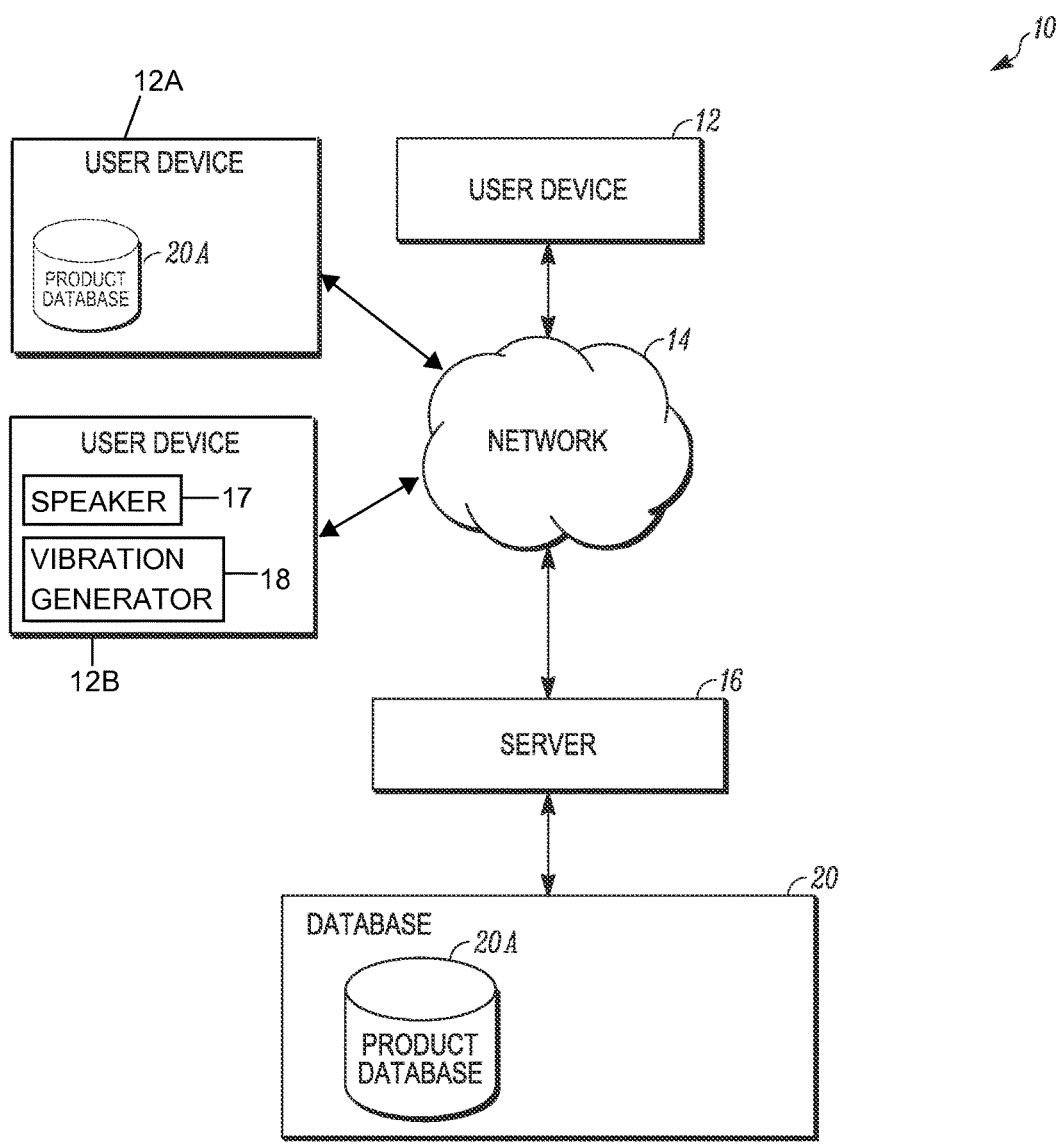
FIG. 1 is a schematic diagram of a system for implementing an accessible user interface for an application with moving objects as described herein, according to some embodiments.

FIG. 1 is a schematic diagram of a system 10 for implementing the accessible user interface described herein, according to some embodiments. In the system 10, a server 16 is connected in communication with a user device 12 via a network 14. The server 16 can also be connected in communication with one or more additional user devices 12A-12B. It will be appreciated that each of the user devices 12, 12A, and 12B can include one or more of the features of the other user devices 12, 12A, and 12B.

The server 16 can make a graphical user interface (GUI) available to the user device 12. The server 16 can make the GUI available over the network 14 according to principles known in the art suitable for allowing a user to access the GUI with the user device 12. In some embodiments, aspects of the server 16 can be the same as or similar to aspects of server device 535 as described in accordance with FIG. 4 below. An application can be loaded onto the user device 12 that can include one or more features of the server 16. For example, the application can make the GUI available to the user device 12, according to some embodiments. Further, in some embodiments, the application can include a database of products or the like, such that the information does not need to be obtained over the network 14 from the server 16 (e.g., user device 12A).

In some embodiments, the network 14 can generally represent the Internet. In some embodiments, the network 14 can include, for example, a local area network (LAN), a wide area network (WAN), a wireless network, a cellular data network, or the like. In some embodiments, aspects of the network 14 can be the same as or similar to aspects of network 540 as described in accordance with FIG. 4 below.

A user can access an application including an accessible user interface by via the user device 12, 12A, 12B. Examples of the user device 12, 12A, 12B include, but are not limited to, a personal computer (PC), a laptop computer, a mobile device (e.g., a smartphone, a personal digital assistant (PDA), a tablet-style device, etc.), or the like. A GUI of the system 10 is displayed on a display of the user device 12, 12A, 12B. The GUI of the system 10 can include items which are audibly or otherwise non-visually provided to the user via, for example, a speaker 17, or other similar audible output means, or a vibration generator 18 of the user device 12B. Examples of the display for the user device 12, 12A, 12B include, but are not limited to, a monitor connected to a PC, a laptop screen, a mobile device screen, a tablet screen, or the like. In some embodiments, aspects of the user device 12, 12A, 12B can be the same as or similar to aspects of user devices 501 as described in accordance with FIG. 4 below. It is to be appreciated that portions of the functionality may be specifically designed to be accessible via one type of user device 12, but not from another type of user device 12, 12A, 12B.

The server 16 is in communication with a database 20. The database 20 generally includes a variety of information on products available from a retailer, such as a product database 20A. In some embodiments, the products may be those products that are available from a particular catalog, such as, but not limited to, a Holiday Season toy catalog, or the like. In some embodiments, the products may be those products that are available from the retailer, either through the retailer's website or in a retail store of the retailer. The product database 20A can include, for example, identifying information and other instructional information that can be audibly played back via the speaker 17 of the user device 12B when accessing the accessible user interface described herein. In some embodiments, all or a portion of the product database 20A can be stored on the user device 12A such that the product database 20A is available without communication over the network 14.

Figure 2:
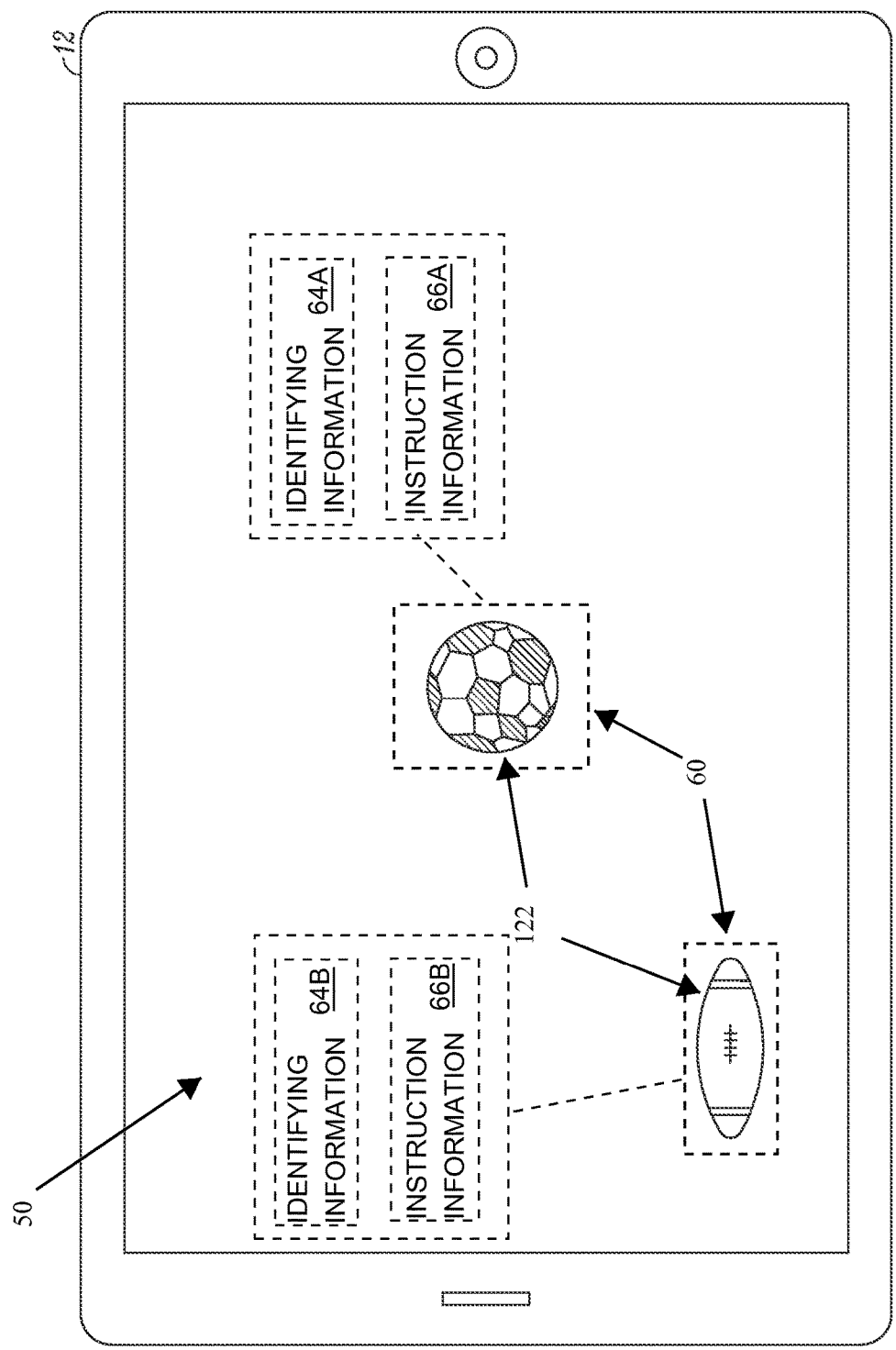
FIG. 2 is a schematic diagram of an accessible user interface for a user device, according to some embodiments.

FIG. 2 is a schematic diagram of a plurality of items 122 displayed on an accessible user interface for a user device 12, according to some embodiments. It is to be appreciated that the items 122 would be moving across the display 50 in any direction (e.g., up, down, left, right, diagonal) with respect to the figure. For simplicity of this specification, only two items 122 are illustrated. It is to be appreciated that the number and types of items displayed on the display 50 of the user device 12 is not intended to be limited to two. It is also to be appreciated that the images and the types of items are intended to serve as examples for the accessible user interface 12 and can vary according to principles described herein.

Each of the items 122 includes an object selection area 60. The object selection area 60 can be sized and shaped based on the item 122 to which the object selection area 60 corresponds. For example, in the figure, the football item 122 includes an object selection area 60 which is a different size rectangle than the objection selection area 60 for the soccer ball item 122. It is to be appreciated that the object selection area 60 is not limited to a rectangular shape and that the object selection area 60 can be a shape other than a rectangle in some embodiments. Each of the object selection areas 60 are associated with one item 122.

Identifying information 64A, 64B about the item 122 is associated with the object selection area 60. Identifying information 64A, 64B includes, but is not limited to, a label (e.g., an item name—football, soccer ball, etc.), a description, or the like. The identifying information 64A, 64B is illustrated in dashed lines because the information is generally not displayed on the display of the user device 12. It will be appreciated that in some embodiments the identifying information 64A, 64B can be displayed on the display of the user device 12 once a user has selected a particular object selection area 60.

Each of the object selection areas 60 includes one or more instruction identifiers 66A, 66B associated therewith. The identifying information 66A, 66B is illustrated in dashed lines because the information is generally not displayed on the display of the user device 12. It will be appreciated that in some embodiments the identifying information 66A, 66B can be displayed on the display of the user device 12 once a user has selected a particular object selection area 60.

In some embodiments, the instruction identifiers 66A, 66B can include information identifying what the user who selects the item can then do. The object selection area 60 is associated with the item 122 such that as the item traverses the display 50, the object selection area 60 traverses the display as well.

The object selection area 60 is selectable such that when a user touches the object selection area 60 (e.g., with a finger, stylus, or other similar device), the identifying information and/or instruction identifiers can be audibly output by the user device 12. In some embodiments, physically touching the object selection area 60 on the display of the user device 12 may not be required. For example, in such embodiments, when a user hovers over the object selection area 60 the object selection area 60 may be identified as having been selected. For example, when the user selects the object selection area 60, the user device 12 may output an audible rendering of the identifying information, such as, but not limited to, a text-to-speech rendering that the user has selected a soccer ball (e.g., using speaker 17 of FIG. 1). The voice-over reading can also instruct the user to, for example, double-tap the display of the user device in order to purchase that item, drag the item across the display 50, or the like. It will be appreciated that the action of double-tapping (or other action) may be performed in any location of the display of the user device, according to some embodiments. This enables the user to browse the screen of the user device 12 using a finger, stylus, or the like, and as a moving item 122 is selected based on the object selection area 60, the user will be informed of which of the items 122 has been selected. In some embodiments, the moving item 122 which is selected based on the object selection area 60 may be paused to prevent moving while the audible message is output. In some embodiments, all moving items 122 on the display 50 may be paused when one of the moving items 122 is selected.

Figure 3:
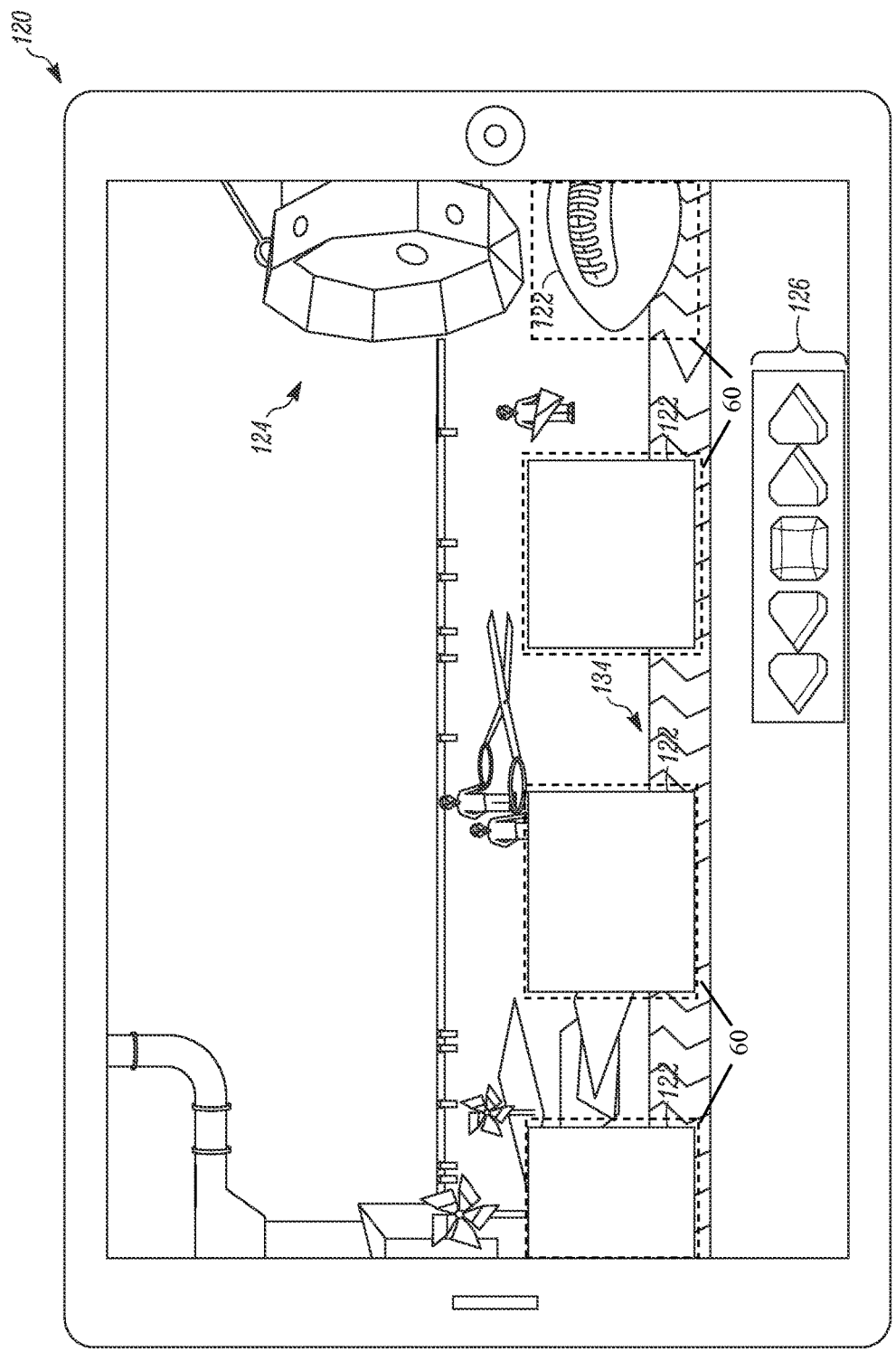
FIG. 3 illustrates an accessible user interface, according to some embodiments.

FIG. 3 illustrates an accessible user interface 120, according to some embodiments. The accessible user interface 120 is generally illustrative of an interface which can include one or more moving items 122, according to some embodiments. In some embodiments, the accessible user interface 120 may be usable from a mobile device, such as, but not limited to, a smartphone or a tablet-style device.

The accessible user interface 120 includes a game-like environment in which items 122 are moving. It is to be appreciated that the text, arrangement of the text, images, and the like, are intended to serve as examples for the accessible user interface 120 and can vary according to principles described herein.

In the illustrated embodiment, the accessible user interface 120 includes a plurality of items 122 cycling into and out of the user's display via a conveyor belt 134. The items 122 represent various items to be displayed to the user to, for example, purchase. The items 122 can be selected by the user by, for example, using a finger to touch (or hover over) the item 122 of interest and dragged into selection tube 124. In some embodiments, a stylus or other similar device can be used for selecting the item 122 of interest on a touchscreen. As an item is added to the selection tube 124, a confirmation sound, vibration, audible message, or the like may be played for the user.

Figure 4:
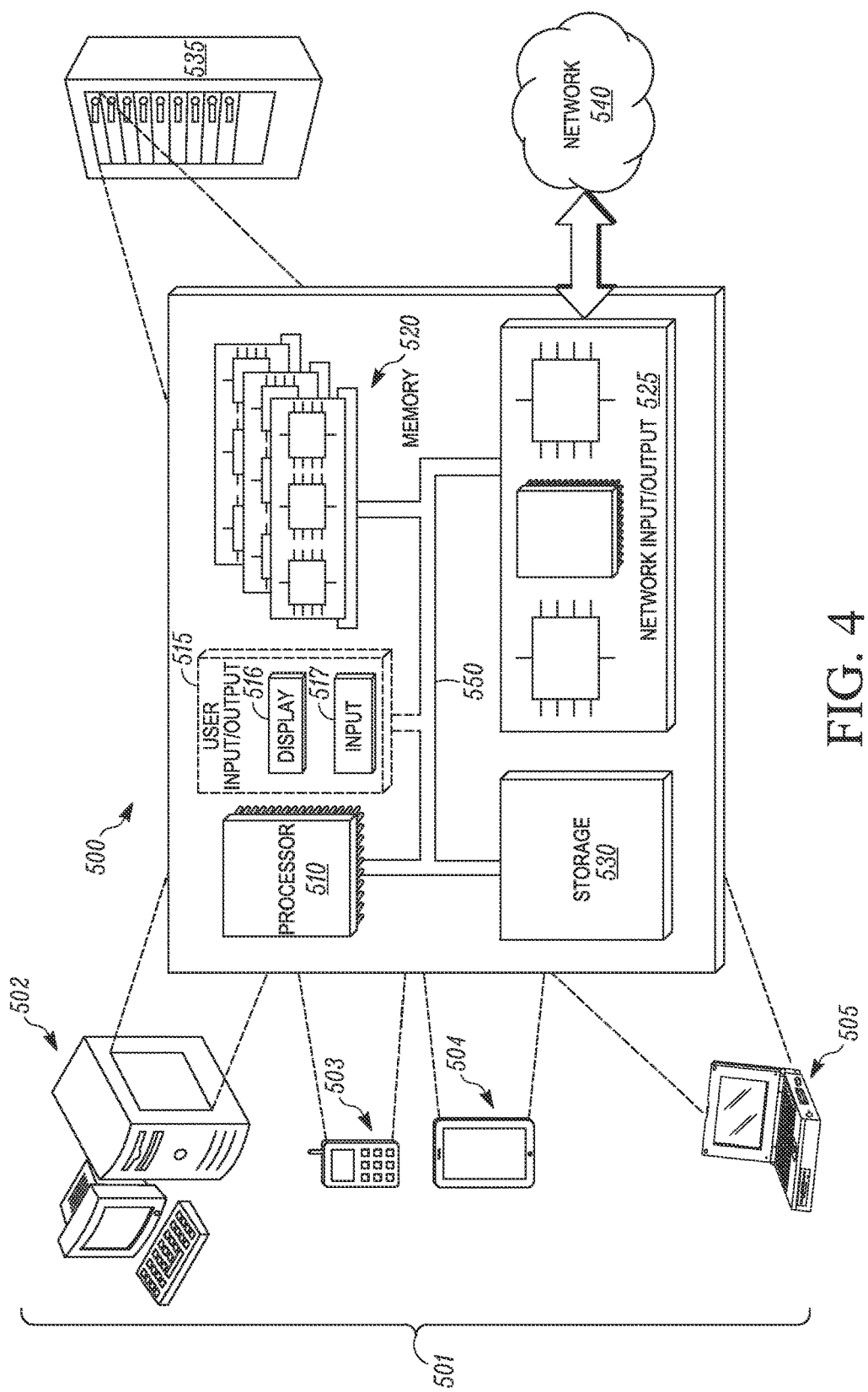
FIG. 4 is a schematic diagram for an architecture for a computing device, according to some embodiments.

The user can control the speed of the conveyor belt 134 with the buttons 126 (e.g., speed up, slow down, stop, or the like). In some embodiments, the moving items 122 can each include an object selection area 60. In some embodiments, the object selection area 60 may be larger than the item 122, while in others the object selection area may be smaller than the item 122. FIG. 4 is a schematic diagram of an architecture for a computer device 500, according to an embodiment. The computer device 500 and any of the individual components thereof can be used for any of the operations described in accordance with any of the computer-implemented methods described herein.

The computer device 500 generally includes a processor 510, memory 520, a network input/output (I/O) 525, storage 530, and an interconnect 550. The computer device 500 can optionally include a user I/O 515, according to some embodiments. The computer device 500 can be in communication with one or more additional computer devices 500 through a network 540.

The computer device 500 is generally representative of hardware aspects of a variety of user devices 501 and a server device 535. The illustrated user devices 501 are examples and are not intended to be limiting. Examples of the user devices 501 include, but are not limited to, a desktop computer 502, a cellular/mobile phone 503, a tablet device 504, and a laptop computer 505. It is to be appreciated that the user devices 501 can include other devices such as, but not limited to, a personal digital assistant (PDA), a video game console, a television, or the like. In some embodiments, the user devices 501 can alternatively be referred to as client devices 501. In such embodiments, the client devices 501 can be in communication with the server device 535 through the network 540. One or more of the client devices 501 can be in communication with another of the client devices 501 through the network 540 in some embodiments.

The processor 510 can retrieve and execute programming instructions stored in the memory 520 and/or the storage 530. The processor 510 can also store and retrieve application data residing in the memory 520. The interconnect 550 is used to transmit programming instructions and/or application data between the processor 510, the user I/O 515, the memory 520, the storage 530, and the network I/O 540. The interconnect 550 can, for example, be one or more busses or the like. The processor 510 can be a single processor, multiple processors, or a single processor having multiple processing cores. In some embodiments, the processor 510 can be a single-threaded processor. In some embodiments, the processor 510 can be a multi-threaded processor.

The user I/O 515 can include a display 516 and/or an input 517, according to some embodiments. It is to be appreciated that the user I/O 515 can be one or more devices connected in communication with the computer device 500 that are physically separate from the computer device 500. For example, the display 516 and input 517 for the desktop computer 502 can be connected in communication but be physically separate from the computer device 500. In some embodiments, the display 516 and input 517 can be physically included with the computer device 500 for the desktop computer 502. In some embodiments, the user I/O 515 can physically be part of the user device 501. For example, the cellular/mobile phone 503, the tablet device 504, and the laptop 505 include the display 516 and input 517 that are part of the computer device 500. The server device 535 generally may not include the user I/O 515. In some embodiments, the server device 535 can be connected to the display 516 and input 517.

The display 516 can include any of a variety of display devices suitable for displaying information to the user. Examples of devices suitable for the display 516 include, but are not limited to, a cathode ray tube (CRT) monitor, a liquid crystal display (LCD) monitor, a light emitting diode (LED) monitor, or the like.

The input 517 can include any of a variety of input devices or means suitable for receiving an input from the user. Examples of devices suitable for the input 517 include, but are not limited to, a keyboard, a mouse, a trackball, a button, a voice command, a proximity sensor, an ocular sensing device for determining an input based on eye movements (e.g., scrolling based on an eye movement), or the like. It is to be appreciated that combinations of the foregoing inputs 517 can be included for the user devices 501. In some embodiments the input 517 can be integrated with the display 516 such that both input and output are performed by the display 516.

The memory 520 is generally included to be representative of a random access memory such as, but not limited to, Static Random Access Memory (SRAM), Dynamic Random Access Memory (DRAM), or Flash. In some embodiments, the memory 520 can be a volatile memory. In some embodiments, the memory 520 can be a non-volatile memory. In some embodiments, at least a portion of the memory can be virtual memory.

The storage 530 is generally included to be representative of a non-volatile memory such as, but not limited to, a hard disk drive, a solid state device, removable memory cards, optical storage, flash memory devices, network attached storage (NAS), or connections to storage area network (SAN) devices, or other similar devices that may store non-volatile data. In some embodiments, the storage 530 is a computer readable medium. In some embodiments, the storage 530 can include storage that is external to the computer device 500, such as in a cloud.

The network I/O 525 is configured to transmit data via a network 540. The network 540 may alternatively be referred to as the communications network 540. Examples of the network 540 include, but are not limited to, a local area network (LAN), a wide area network (WAN), the Internet, or the like. In some embodiments, the network I/O 525 can transmit data via the network 540 through a wireless connection using WiFi, Bluetooth, or other similar wireless communication protocols. In some embodiments, the computer device 500 can transmit data via the network 540 through a cellular, 3G, 4G, or other wireless protocol. In some embodiments, the network I/O 525 can transmit data via a wire line, an optical fiber cable, or the like. It is to be appreciated that the network I/O 525 can communicate through the network 540 through suitable combinations of the preceding wired and wireless communication methods.

The server device 535 is generally representative of a computer device 500 that can, for example, respond to requests received via the network 540 to provide, for example, data for rendering a website on the user devices 501. The server 535 can be representative of a data server, an application server, an Internet server, or the like.

Aspects described herein can be embodied as a system, method, or a computer readable medium. In some embodiments, the aspects described can be implemented in hardware, software (including firmware or the like), or combinations thereof. Some aspects can be implemented in a non-transitory, tangible computer readable medium, including computer readable instructions for execution by a processor. Any combination of one or more computer readable medium(s) can be used.

The computer readable medium can include a computer readable signal medium and/or a computer readable storage medium. A computer readable storage medium can include any tangible medium capable of storing a computer program for use by a programmable processor to perform functions described herein by operating on input data and generating an output. A computer program is a set of instructions that can be used, directly or indirectly, in a computer system to perform a certain function or determine a certain result.

Examples of computer readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing. A computer readable signal medium can include a propagated data signal having computer readable instructions. Examples of propagated signals include, but are not limited to, an optical propagated signal, an electro-magnetic propagated signal, or the like. A computer readable signal medium can include any computer readable medium that is not a computer readable storage medium that can propagate a computer program for use by a programmable processor to perform functions described herein by operating on input data and generating an output.

Some embodiments can be provided to an end-user through a cloud-computing infrastructure. Cloud computing generally includes the provision of scalable computing resources as a service over a network (e.g., the Internet or the like).

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method for facilitating browsing of an accessible user interface the method comprising:
providing an application in a retail environment for a computing device adapted to be accessible for visually impaired users, the computing device having an input and a display, the application permitting a user to select an object selection area associated with a moving item using the input of the computing device when the moving item is displayed on the display of the computing device, wherein the moving item is virtually moving about the display from a first location to a second location without user input;
receiving an indication of the selected object selection area from the computing device, wherein the indication of the selected object selection area is in response to a hovering over or a touching of the object selection area on the display of the computing device;
pausing virtual motion of the moving item in response to receiving the indication of the selected object selection area from the computing device;
identifying the moving item associated with the object selection area;
generating a non-visual feedback to the user, the non-visual feedback being based on the identified moving item, the non-visual feedback including a text-to-speech rendering of identifying information determined from identifying the moving item associated with the object selection area, and the non-visual feedback providing instructions for further selection of the selected object selection area; and providing the accessible user interface for display on the computing device.

2. The method according to claim 1, wherein the non-visual feedback includes one or more of a vibration and an audible alert.

3. The method according to claim 1, wherein the non-visual feedback includes an audible voice reading of identifying information corresponding to the moving item.

4. The method according to claim 1, wherein the object selection area is associated with the moving item such that the object selection area moves about the display along with the moving item.

5. The method according to claim 1, wherein a size and shape of the object selection area is based on the moving item, the size of the object selection area being relatively larger than the moving item.

6. An accessible user interface for a computing device comprising:

an application loadable onto a user device in a retail environment that is adapted to be accessible for visually impaired users, the application provides the accessible user interface for selecting one of a plurality of object selection areas, each of the plurality of object selection areas associated with one of a plurality of moving items, the plurality of moving items virtually moving across a display of the user device from a first location to a second location without user input, the accessible user interface displayable on the user device, each of the plurality of moving items being selectable by a user in response to a hovering over or a touching of the one of the plurality of object selection areas on the user device, wherein when selected, the application pauses virtual motion of the moving item and the application causes the user device to provide instructions for further selection of the one of the plurality of object selection areas, the instructions including a text-to-speech rendering of identifying information determined from identifying the moving item associated with the object selection area, wherein each object selection area associated with each moving item is relatively larger in size than the associated moving item.

7. The accessible user interface according to claim 6, wherein an audible output means receives a selection from the plurality of object selection areas and causes an audible, non-visual output from an output of the user device.

8. The accessible user interface according to claim 6, wherein each of the object selection areas includes the identifying information and instruction information based on the moving item.

9. The accessible user interface according to claim 8, wherein one of the identifying information and the instruction information is audibly provided to the user via an output of the user device.

10. The accessible user interface according to claim 6, wherein the accessible user interface is paused when one of the plurality of moving items is selected.

11. The method according to claim 1, further comprising enabling accessibility functionality on the computing device.

12. The accessible user interface according to claim 6, wherein the computing device has accessibility functionality enabled.

\* \* \* \* \*